May 3, 1966     O. G. LEWIS     3,248,967
VARIABLE INERTIA LIQUID FLYWHEEL

Filed Jan. 6, 1964     2 Sheets-Sheet 1

INVENTOR.
OLIVER G. LEWIS
BY *James F. Bryan*
ATTORNEY

May 3, 1966    O. G. LEWIS    3,248,967
VARIABLE INERTIA LIQUID FLYWHEEL

Filed Jan. 6, 1964    2 Sheets-Sheet 2

INVENTOR.
OLIVER G. LEWIS
BY James T. Bryan
ATTORNEY

United States Patent Office 3,248,967
Patented May 3, 1966

3,248,967
VARIABLE INERTIA LIQUID FLYWHEEL
Oliver G. Lewis, Westfield, N.J., assignor to Esso Research and Engineering Company, a corporation of Delaware
Filed Jan. 6, 1964, Ser. No. 335,991
5 Claims. (Cl. 74—572)

This invention relates to flywheels and, more particularly, to means for varying the inertia of a flywheel during its operation without changing the external configuration of the flywheel.

In accordance with the invention, a variable inertia flywheel is provided comprising a wheel body having spoke-like cylinders interconnecting the hub and rim portions thereof, each containing a light weight piston-like plug. The cylinder contains a predetermined quantity of substantially incompressible fluid, preferably a dense liquid, such as mercury, which with the plug, entirely fills the cylinder. In a particular embodiment, mercury is permitted to move from one end of the cylinder to the other through longitudinal openings in the pistons upon radial movement of the latter. Thus, the light weight pistons are used to shift a quantity of liquid equal to the volume of the pistons relatively toward or away from the center of rotation, thereby varying the inertia of the flywheel.

The pistons may each be threadably engaged by a rod extending axially of a cylinder with inner ends of the rods having pinions which engage a bevel-ringed gear. The pistons are keyed against rotation to the wall of the cylinder such that when the ring gear is rotated by an electrical motor mounted to the hub, the rods are rotated simultaneously to translate the piston plugs within each of the radial cylinders.

Figure 1:
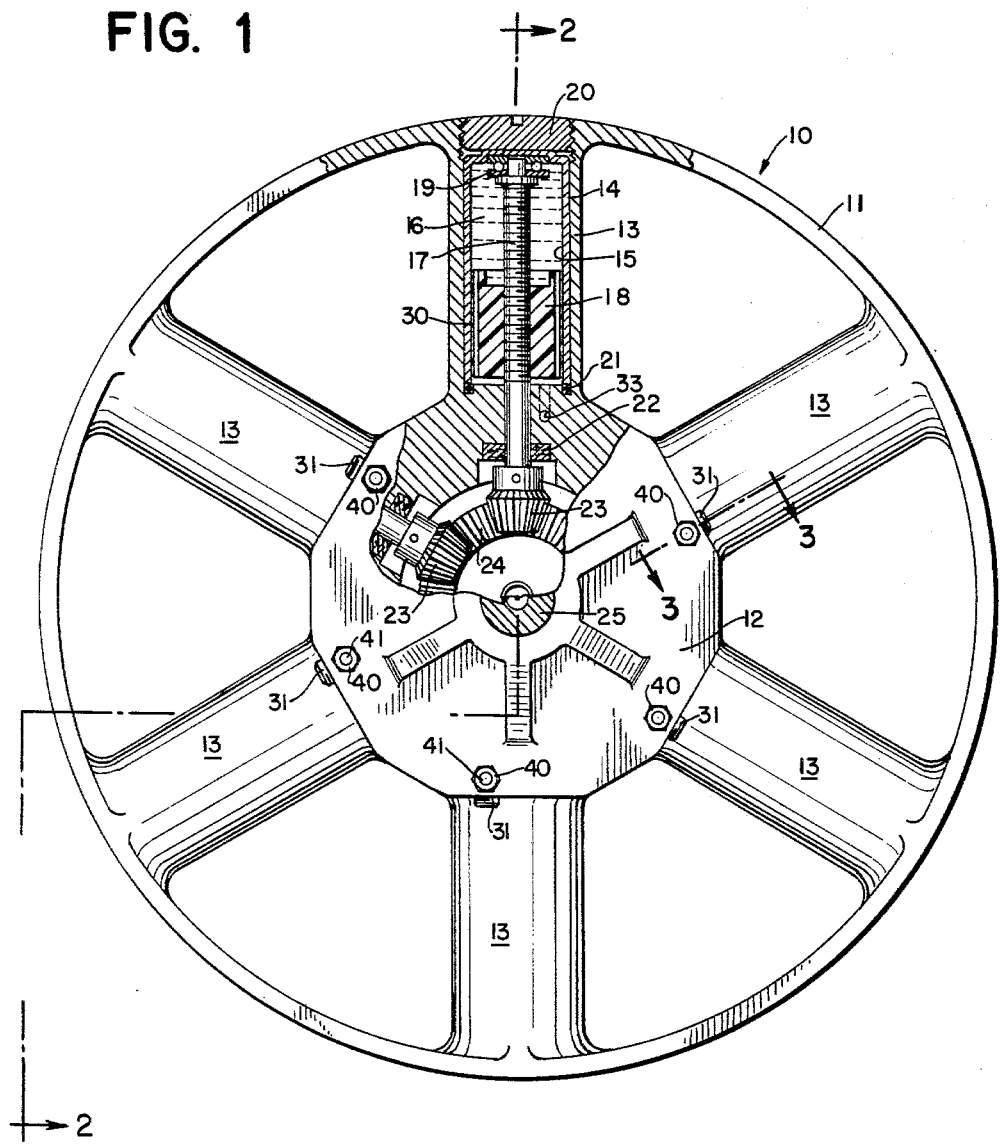
Figure 2:
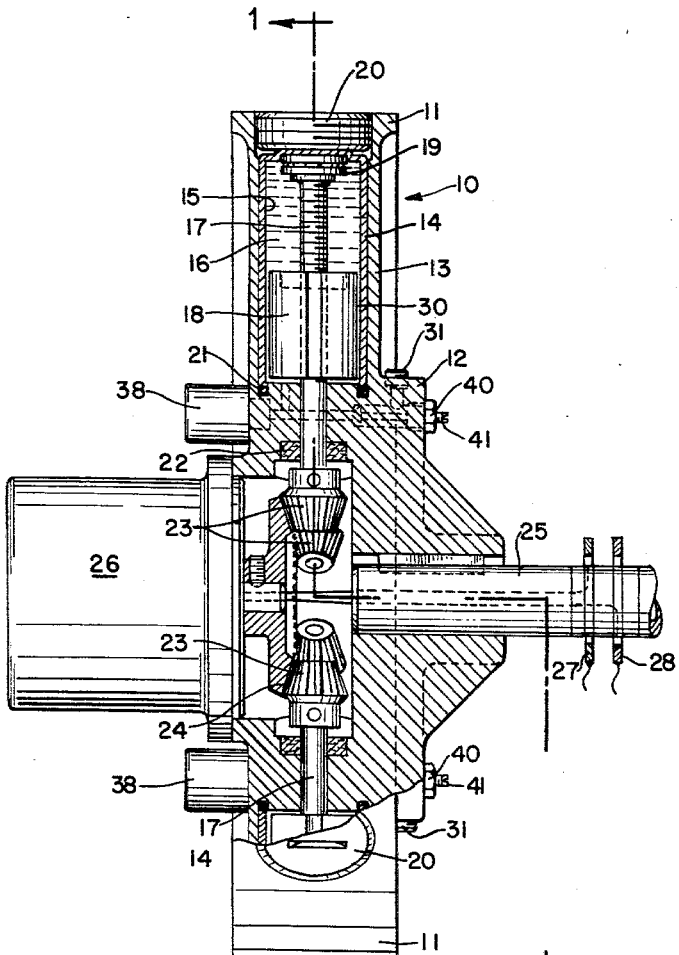
Figure 3:
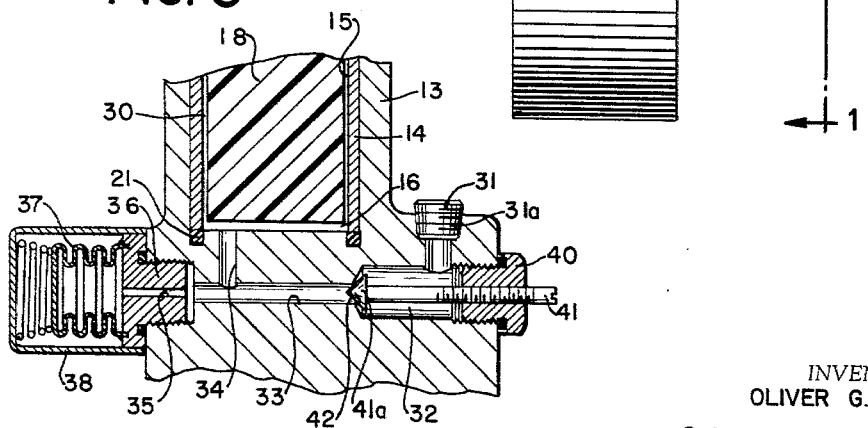

We refer now by way of a nonlimiting example to a particular embodiment of the invention which has been set forth in the following description and in the accompanying drawing in which FIGURE 1 is a plan view of a variable inertia flywheel according to the invention with a portion thereof in cross section;

FIGURE 2 is a partial cross section taken in the direction of arrows 2—2 of FIGURE 1; and FIGURE 3 is a fragmentary-enlarged detail of a portion of FIGURE 1 showing the refilling mechanism for a cylinder thereof.

Referring now to the drawing, reference numeral 10 indicates generally a variable inertia flywheel constructed according to the principles of the invention. The flywheel 10 has an outer rim 11 and a central hub 12 connected to a shaft 25 which may be driven by a suitable means to rotate the flywheel 10 about the axis of shaft 25. Intermediate and integrally connected to the hub and rim the flywheel includes spokelike cylinders 13 which extend radially at equal intervals from the center. An inverted cup-shaped member 14, preferably of stainless steel, is situated tightly as a sleeve or liner within each cylinder 13 and defines a cylindrical passage or chamber 15 adapted to contain a predetermined quantity of dense fluid, in this case, liquid mercury 16. The member 14, being closed at its upper or outer end, completely prevents leakage of the mercury in this direction from the chamber 15, even under extreme pressures produced by centrifugal force. The chambers 15 are filled and are maintained under a predetermined static pressure of liquid by the arrangement shown in FIGURE 3, which will be described subsequently.

Axially within the chamber 14 is a rod 17 which is in threaded engagement with a pistonlike plug 18. The plug 18 will be made of a much less dense material than the fluid within the chamber 14, nylon, for example, for reasons which will become apparent. The rod 17 at its outer end is joined to one-half of a thrust bearing 19 with the opposing half of the bearing being held within a recessed upper end of the member 14. The latter is secured by a retainer 20 threaded within the periphery or rim of the wheel and is sealed about its lower edge by an O-ring seal 21.

At its inner end, the rod 17 passes through a wall 13a of the cylinder with packing 22 being provided to prevent leakage around the rod. Each of the rods 17 are connected to beveled pinions 23 which in turn mesh with a beveled ring gear 24 mounted for rotation within the hub 12. The gear 24 may be rotated by connecting a shaft portion 24a thereof to a reversible electric motor 26 mounted coaxially upon the hub. The electric motor 26 may be energized by means of the slip ring connections 27, 28 to drive the ring 24 alternately in clockwise or counterclockwise directions. Rotation of the gear 24 will effect simultaneous rotation of each of the rods 17. Each of the piston plugs 18 are keyed at 18a within corresponding grooves in the members 14 to prevent rotation of the plugs. Longitudinal openings 30 are provided through each of the plugs 18 communicating with opposite ends thereof to permit relatively free passage of mercury from one end of the cylindrical chamber 15 to the other.

In FIGURE 3 is shown a means for filling each cavity or chamber 15 to assure that the chambers will at all times be completely full of liquid to prevent unbalance of the flywheel which would result from cavitation of the liquid 16. Accordingly, I have provided a refill plug 31 threaded into the hub 12 at 31a and which may be removed for connecting a pump containing liquid mercury 16 to the opening 31a. The opening 31a communicates with a chamber 32 which by successive connected passages 33 and 34 communicates with a chamber 15 in each cylinder 13. The passage 33 further communicates through duct 35 in a plug 36 with the interior of a syphon bellows 37 whose open end is in seal-tight relation to the face of the plug 36. The plug 36 further secures a cap 38 which permits a spring 39 intermediate the cap and bellows 37 to force the latter toward the plug 36.

Adjacent to the fill opening 31a is a threaded member 40 which carries a valve stem 41 threaded internally to the member 40. The stem 41 has a conical end 41a which may be seated at 42 by rotating the stem 41 to seal off the chamber 32 from the adjacent passage 33.

By the mechanism of FIGURE 3, mercury 16 under pressure may be introduced through the filler opening 31a with the stem 41 and end 41a thereof backed off its seat 42. Mercury under pressure will therefore be introduced into a chamber 15 and into the bellows 37. Thereafter, when all voids have been filled, the stem 41 is rotated to seal the chamber 32 from passage 33 causing the bellows 37 to maintain pressure in the chamber 15. The pump may then be disconnected from opening 31a and filler plug 31 replaced.

In operation, when the rods 17 are rotated by the aforedescribed gear and motor arrangement, the plugs 18 are translated simultaneously and in effect displace a volume of mercury 16 equal to the volume of the plugs. By this means, the total inertia of the flywheel may be selectively varied while the flywheel 10 is rotated by the shaft 25 without varying the external configuration of the flywheel.

By way of example, the following calculations are illustrative of the variation in inertia which may be accomplished according to the foregoing structure:

(a) Assuming a rotating mass with cylinders whose outer internal periphery described a 30-inch diameter arc.

(b) Nylon plugs having a total volume of 2 cubic feet.

(c) Stroke of plugs=5 inches or displacing 2 cubic feet of mercury.

(d) Disregarding weight of cylinder walls and hub mechanism.

Wherein $W$=Weight in pounds for the sample cubic footage of mercury (Hg) and nylon ($n$) respectively $I$=Inertia $r1$ and $r2$=radii of gyration of mercury and nylon With plugs at extreme inner position:

$$I_{Hg} = \frac{1}{2}\frac{W}{g}\left[\frac{r1}{12}+\frac{r2}{12}\right]^2 = \frac{1}{2}\frac{1690\#}{32.2}\left[\left(\frac{15}{12}\right)^2+\left(\frac{10}{12}\right)^2\right]$$

$$= \frac{1}{2}\, 52.5[1.25^2+.833^2]=59.2 \text{ slug foot}$$

$$I_n = \frac{1}{2}\frac{60}{32.2}\left[\left(\frac{10}{12}\right)^2+\left(\frac{5}{12}\right)^2\right]=.93[.833^2+.417^2]=.81$$

Total $I=59.2+.81=60.01$ slug foot

With plugs at extreme outer position:

$$I_{Hg} = \frac{1}{2}\, 52.5[.833^2+.417^2]=22.8 \text{ slug foot}$$

$$I_n = \frac{1}{2}\frac{60}{32.2}[1.25^2+.833^2]=2.1 \text{ slug foot}$$

Total $I=22.8+2.1=24.9$ slug foot

A particular feature of the present invention is the manner in which positive displacement of a dense liquid is accomplished by completely filling the void or cavity within the cylindrical spokes with the liquid and plug combination. Thus, eccentricities of rotation due to indiscriminate shifting of the dense liquid are avoided. Also, the present construction does not require the sealing of any movable parts since the pistons 18 are merely members for displacing equal volumetric amounts of dense liquid and, in fact, provide for passage of liquid to positions adjacent opposite ends of the pistons.

It will be understood that the foregoing relates to a specific embodiment of the invention and is merely representative. Therefore, in order to appreciate fully the spirit and scope of the invention, reference should be made to the appended claims.

What is claimed is:

1. A variable inertia flywheel comprising a wheel body, radial passages defined by said body each containing a quantity of fluid substantially incompressible, plug means for selectively shifting a volume of said fluid equal to said plug means into predetermined radial locations in said passages and means for actuating and controlling movement of said plug means, the plug means, the actuating and controlling means, and said fluid substantially filling the volume of said passages, one of said plug means and fluid being respectively of a denser and less dense material.

2. A flywheel according to claim 1 in which said passages are tubular and extend radially from the wheel center at equal intervals, the plug means is relatively lightweight and equal in volume with respect to said fluid, and valve means are provided to effect the flow of said fluid from said passage adjacent one end of said plug means to said passage adjacent to the other end thereof upon radial movement of said plug means whereby said plug means may selectively displace portions of the denser fluid and vary the inertia of the flywheel.

3. The flywheel according to claim 2 in which the fluid is mercury and the plugs are of nylon and the like, the valve means comprising longitudinal openings in said plugs communicating with opposite ends thereof.

4. A variable inertia flywheel comprising a wheel body, a series of spokelike cylindrical members proceeding at equispaced intervals radially from the center of said body to the rim thereof, each of said cylindrical members being identical and defining cylindrical chambers extending generally from said center to said rim, a plurality of plugs one each in said chambers and slidable longitudinally therein, a liquid filling each chamber, an opening in each plug communicating with opposite ends thereof, a rod threadably connected to each plug and extending centrally of said wheel, means keying each plug internally to said cylinders for preventing rotation of said plugs, a housing mounted at the wheel hub, gear means in said housing in engagement with each of said plug rods, and motor means secured to said hub for driving said gear means in opposite directions to cause simultaneous translation of said plugs in said chambers toward and away from the center of the wheel.

5. The flywheel of claim 4 in which the plugs are of nylon and the like and the liquid is mercury, an inverted cup-shaped member with the radially outer end thereof closed defining in part each said chamber and means for maintaining under predetermined pressure said chambers completely full of mercury.

References Cited by the Examiner

UNITED STATES PATENTS

| | | | |
|---|---|---|---|
| 2,525,781 | 10/1950 | De Remer | 74—573 |
| 2,659,243 | 11/1953 | Darrieus | 74—573 |

FOREIGN PATENTS 482,685   4/1938   Great Britain.

BROUGHTON G. DURHAM, *Primary Examiner.*

WESLEY S. RATLIFF, Jr., *Assistant Examiner.*